United States Patent
McCue

(10) Patent No.: US 9,353,545 B2
(45) Date of Patent: May 31, 2016

(54) PORTABLE ENCLOSURE APPARATUS AND METHOD

(76) Inventor: Geoff McCue, Lawrence, KS (US)

(*) Notice: Subject to any disclaimer, the term of this patent is extended or adjusted under 35 U.S.C. 154(b) by 270 days.

(21) Appl. No.: 13/538,327

(22) Filed: Jun. 29, 2012

(65) Prior Publication Data

US 2013/0105752 A1 May 2, 2013

Related U.S. Application Data

(60) Provisional application No. 61/502,618, filed on Jun. 29, 2011.

(51) Int. Cl.
| | |
|---|---|
| A01K 3/00 | (2006.01) |
| E04H 17/04 | (2006.01) |
| E04H 17/06 | (2006.01) |
| E04H 17/08 | (2006.01) |
| E04H 17/12 | (2006.01) |
| E04H 17/14 | (2006.01) |

(52) U.S. Cl.
CPC ...... *E04H 17/14* (2013.01); *A01K 3/00* (2013.01); *E04H 17/04* (2013.01); *E04H 17/06* (2013.01); *E04H 17/08* (2013.01); *E04H 17/12* (2013.01)

(58) Field of Classification Search
CPC .......... A01K 3/00; E04H 17/04; E04H 17/06; E04H 17/08; E04H 17/10; E04H 17/12; E04H 17/14; E04H 17/161; E04H 17/18; E04H 17/22; E04H 17/261; E04H 17/266; E04H 2017/1495
USPC ............... 256/10, 24–31, 35, 47, 48, DIG. 2; 52/146–152, 741.1
See application file for complete search history.

(56) References Cited

U.S. PATENT DOCUMENTS

| | | | | |
|---|---|---|---|---|
| 600,401 | A * | 3/1898 | Brisbin | E04H 17/08 256/37 |
| 717,736 | A * | 1/1903 | Crow | E04H 17/08 256/35 |
| 1,210,541 | A * | 1/1917 | Ryker | 256/47 |
| 1,981,447 | A * | 11/1934 | Clark | 256/35 |
| 2,690,326 | A * | 9/1954 | Kranick | 256/35 |
| 2,799,369 | A * | 7/1957 | Walton | E04H 17/08 52/151 |
| 3,572,639 | A * | 3/1971 | Shettel | 256/47 |
| 3,740,023 | A * | 6/1973 | Bruggeman | 256/24 |
| 5,061,109 | A * | 10/1991 | Miller | 403/36 |
| 7,070,136 | B1 * | 7/2006 | Bailey | 241/260.1 |
| 2011/0253962 | A1 * | 10/2011 | Sadinsky et al. | 256/24 |

* cited by examiner

*Primary Examiner* — Josh Skroupa
(74) *Attorney, Agent, or Firm* — Polsinelli PC; Adam C. Rehm

(57) ABSTRACT

A portable enclosure quick exchange framing system having a plurality of adjustable securing elements and a fence operable to be secured to the securing elements. The securing elements are operable to be anchored in the ground or a support base. The portable enclosure system is easily configurable to fit in any yard or area.

14 Claims, 5 Drawing Sheets

PORTABLE ENCLOSURE APPARATUS AND METHOD

CROSS-REFERENCE TO RELATED APPLICATION

This Patent Application claims priority to U.S. patent application Ser. No. 61/502,618 filed Jun. 29, 2012 and titled Portable Enclosure Apparatus and Method, the entire contents of which is incorporated herein by reference in its entirety.

BACKGROUND OF THE INVENTION

1. Field

Embodiments of the present invention relate to portable enclosures. More particularly, embodiments of the present invention relate to portable enclosures for retaining animals.

2. Discussion of Related Art

There are many types of conventional enclosures, such as fencing, designed for various purposes, e.g., keeping people and/or animals in and/or out. In most cases, fencing is permanent, which may be undesirable for a number of reasons, e.g., aesthetic, limits use of area, only occasionally desired.

Accordingly, there is a need to provide an enclosure apparatus that remedies the aforementioned deficiencies in the conventional art.

SUMMARY OF THE INVENTION

The following brief description is provided to indicate the nature of the subject matter disclosed herein. While certain aspects of the present inventive concept are described below, the summary is not intended to limit the scope of the present inventive concept. Embodiments of the present inventive concept provide a portable enclosure system and method. The present inventive concept does not suffer from and remedies the deficiencies of conventional enclosures such as those previously set forth herein.

The present inventive concept provides, in its simplest form, a plurality of adjustable securing elements and a fence operable to be secured to the securing elements. The securing elements are operable to be anchored in the ground. The portable enclosure system is easily configurable to fit in any yard or area.

The aforementioned may be achieved in one aspect of the present invention by providing an enclosure system including a plurality of adjustable securing elements. Each of the adjustable securing elements having two pivoting ends extending therefrom, at least one receiver, and/or at least one stake. The plurality of adjustable securing elements may include a center post with hinges to secure the two pivoting ends to the center post. Each of the two pivoting ends may include a lower bar extending perpendicular to the center post and an angled bar extending from an end of the lower bar to the center post.

The enclosure system may include a fence operable to be secured to each of the plurality of adjustable securing elements via the at least one receiver. Each of the two pivoting ends may include another stake. Each of the plurality of adjustable securing elements may be operable to be independently configured to one of an open configuration, a closed configuration, and a corner configuration. The enclosure system may include a plurality of bottom supports having overlapping ends operable to be aligned and simultaneously penetrated via a portion of the at least one stake to lock the plurality of bottom supports together.

The enclosure system may include a plurality of bottom supports having overlapping ends operable to be aligned and penetrated via a portion of the at least one stake to lock the plurality of bottom supports together. The at least one receiver may be rotatable about at portion of each of the plurality of adjustable securing elements so that, upon engagement of the at least one receiver to the fence, rotation of the at least one receiver adds tension to the fence.

The aforementioned may be achieved in another aspect of the present invention by providing a method of using an enclosure system including staking a plurality of adjustable securing elements in the ground, each of the adjustable securing elements having two pivoting ends extending therefrom, at least one receiver, and at least one stake. The method may further include the step of securing a fence to each of the plurality of adjustable securing elements via the at least one receiver.

Additional aspects, advantages, and utilities of the present invention will be set forth in part in the description which follows and, in part, will be obvious from the description, or may be learned by practice of the present invention.

BRIEF DESCRIPTION OF THE DRAWINGS

Embodiments of the present invention are described in detail below with reference to the attached drawing figures, wherein.

Figure 1:
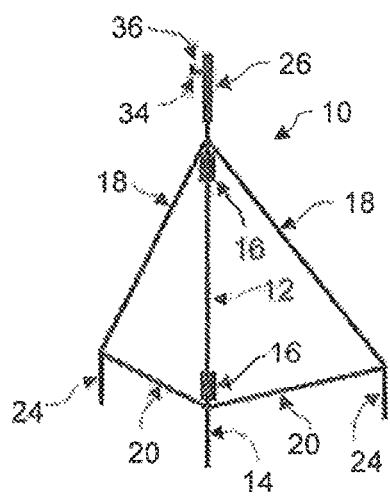
FIG. 1 is a schematic view of an adjustable securing element in a corner configuration.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
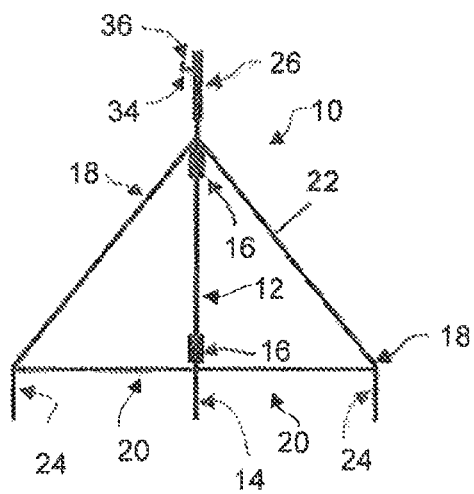
FIG. 2 is a schematic view of an adjustable securing element in an open configuration.
Figure 3:
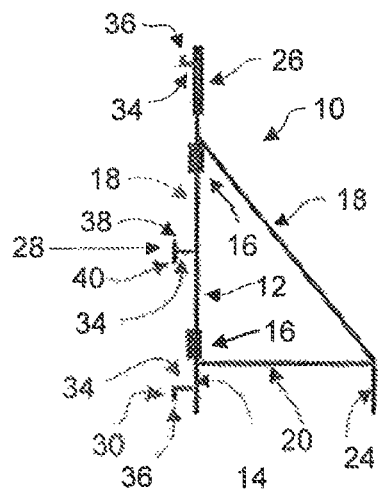
FIG. 3 is a schematic view of an adjustable securing element in a closed configuration.

Turning to the drawings and particularly FIGS. 1-3, an adjustable securing element 10 is illustrated in a plurality of configurations. The securing element 10 is made of a lightweight, durable material, e.g., tubular aluminum or the like, and includes an elongated center post 12 having a stake 14 at a bottom end thereof sized and shaped to extend into a ground surface. A plurality of hinges 16 are spaced from each other along the center post 12. Extending from the center post 12 and independently connected at the hinges 16 are two identical pivoting "V" elements 18. Each of the "V" elements includes a lower post 20 that extends perpendicular to the center post 12 and an angled post 22 that extends at an angle from the center post 12.

In the exemplary embodiment, the angled post 22 preferably extends from the center post 12 between approximately 15 and 45 degrees, and more preferably at 30 degrees. Depending from a junction between the lower post 20 and the angled post 22 is another stake 24 that is sized and shaped to extend into a ground surface.

The center post 12 has a plurality of receivers extending laterally therefrom, i.e., an upper receiver 26, a middle receiver 28, and a lower receiver 30. Each of the receivers 26, 28, 30 are sized and shaped to independently receive a portion of a fence 32. The fence 32 may be formed of Kevlar, plastic, a resilient metal and/or wire, rope, fabric, fiberglass, and/or any other flexible, high-strength material. The upper receiver 26 and lower receiver 30 have a mirrored design with respect to each other, which includes an outwardly-ending portion 34 and a single parallel extending portion 36. The upper receiver 26 is rotatable relative to the center post 12. The middle receiver 28 also includes the outwardly portion 34, but includes dual, upper and lower parallel extending portions 38, 40.

Figure 4:
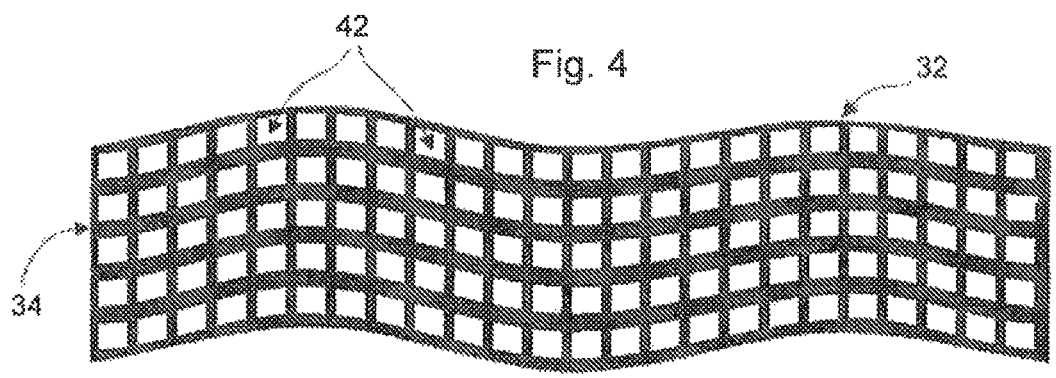
FIG. 4 is a perspective view of a fence with apertures.

Turning to FIG. 4, the fence 32 includes a plurality of apertures 42. The apertures 42 are sized and shaped to receive one or more of the receivers 26, 28, 30 and are sized depending on type of material of the fence 32. When each of the receivers 26, 28, 30 are received by the fence 32, the fence 32 is secured to the adjustable securing element 10, and the adjustable securing element 10 and the fence 32 may be simultaneously staked into the ground. It is foreseen, however, that the adjustable securing element 10 may be staked into the ground prior to engagement with the fence 32 without deviating from the scope of the present inventive concept.

Figure 5:
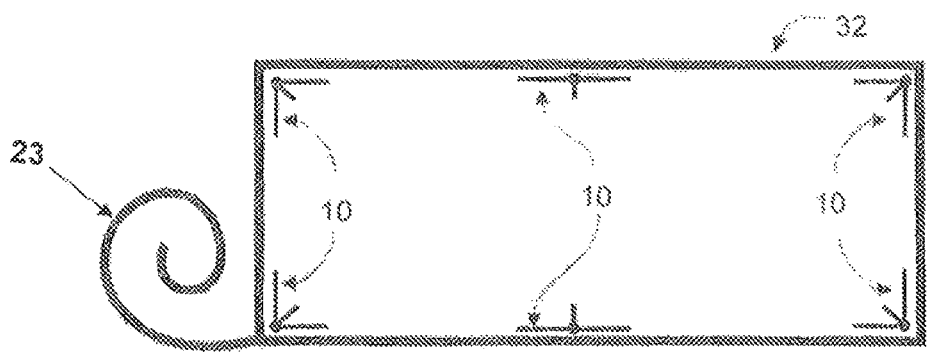
FIG. 5 is a schematic view of a plurality of adjustable securing elements with the fence attached thereto in a rectangular configuration.
Figure 6:
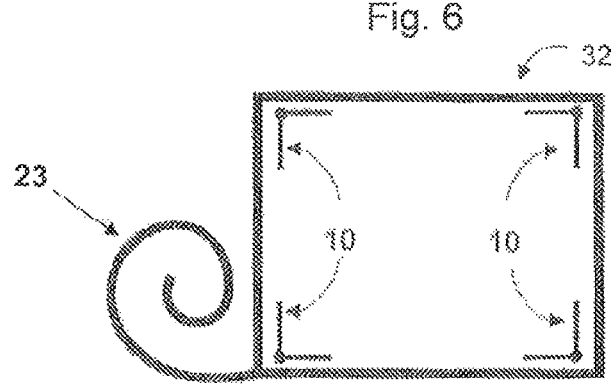
FIG. 6 is a schematic view of a plurality of adjustable securing elements with the fence attached thereto in a square configuration.
Figure 7:
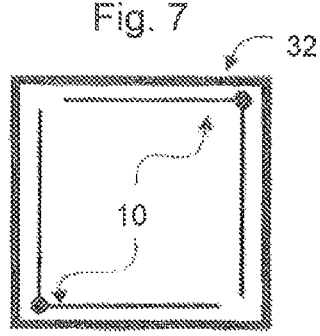
FIG. 7 is a schematic view of a plurality of adjustable securing elements with the fence attached thereto in a miniature square configuration ideal for use with a plant.

The adjustable securing element 10 with the fence 32 may be constructed in a variety of configurations to accommodate a variety of sizes, e.g., 24" to 60" or more, as illustrated in FIGS. 5-7. Without limitation, the variety of configurations includes square, rectangle, or octagon. In a stored configuration, the adjustable securing element 10, which is approximately 48" long, with the fence 32 may be stored in an area of about 48"×12"×18' with the adjustable securing element 10 in a closed configuration. When a user desired to setup the adjustable securing element 10 with the fence 32, the adjustable securing element 10 is positioned in one of an open configuration, as illustrated in FIG. 2, a corner configuration, as illustrated in FIGS. 1 and 3, or something in between. Once positioned in the desired configuration, the adjustable securing element 10 is positioned in the ground via the stake 14 and the another stake 24. To aid in positioning the stake 14 and the another stake 24 into the ground, the user may apply a downward force on the lower post 20. It is foreseen that the lower post 20 may include a friction-heightening element, e.g., ribbing or the like, to prevent slippage when the user interacts with the lower post 20.

Figure 8:
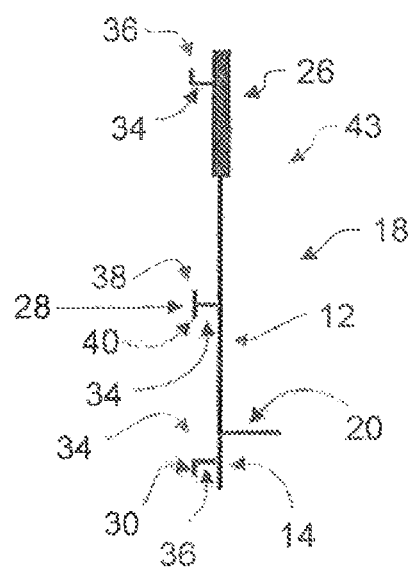
FIG. 8 is a schematic view of a non-adjustable securing element.

Once anchored in the ground, the user may secure the fence 32 to the adjustable securing element 10. A plurality of the adjustable securing elements 10, e.g., four or more, may be used to form the enclosure with assembly of each of the adjustable securing elements 10 following the same aforementioned steps. Additionally one or more nonadjustable securing elements 43 may be used to form the enclosure, as illustrated in FIG. 8. The stake elements 43 includes all of the parts of the adjustable securing element 10, e.g., the receivers 26, 28, 30 etc., but does not include the elements 18.

Figure 9:
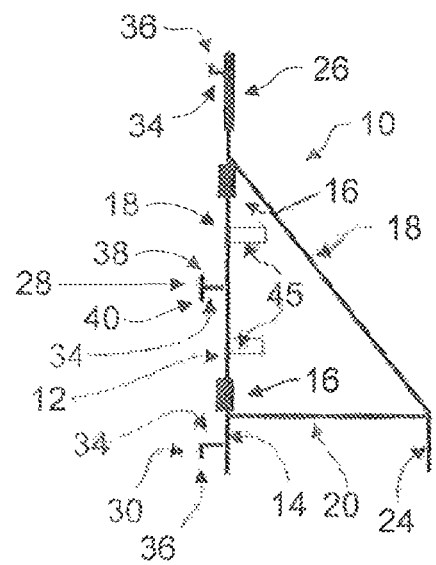
FIG. 9 is a schematic view of an adjustable securing element in a closed configuration.
Figure 10:
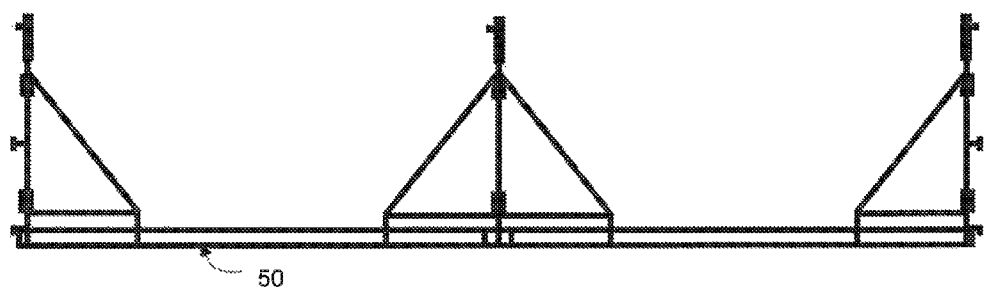
FIG. 10 is a schematic view of adjustable securing elements mounted in a bottom support.
Figure 11:
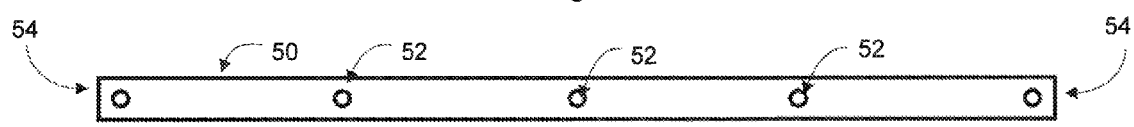
FIG. 11 is a top plan view of a bottom support.
Figure 12:
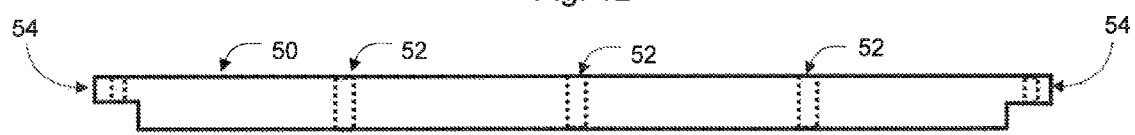
FIG. 12 is an elevated side view of adjustable securing elements mounted in a bottom support.
Figure 16:
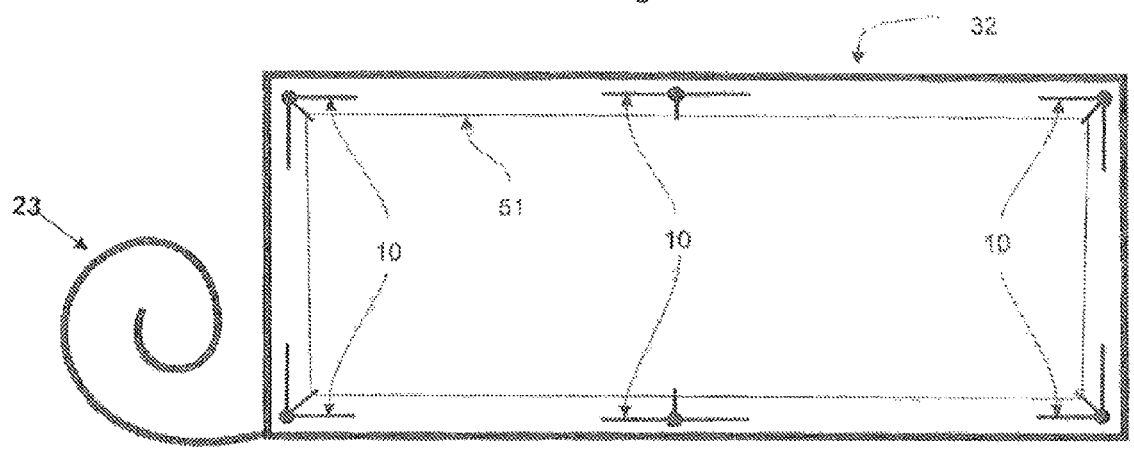
FIG. 16 is a schematic view of view of a an electric wire and a fence.

In the exemplary embodiment, ends 44 of the fence 32 are secured at a single one of the adjustable securing elements 10 with any excess 23 wound around the one of the adjustable securing elements 10. To add or increase tension of the fence 32, the upper receiver 26 is rotated about the center post 12. Adding tension to the fence 32 via the upper receiver 26 increases a height of the fence 32 relative to the ground. In this manner, the adjustable securing element 10 and the fence 32 forms an enclosure. It is foreseen that the middle receiver 28 and/or lower receiver 30 may be made to be rotatable about the center post 12 without deviating from the scope of the present inventive concept. It is also foreseen that an electric wire 51 may be threaded through clips 45 on each of the adjustable securing elements 10 to form an enclosure having an electrical deterrent, e.g., to keep animals in/out of the enclosure, as illustrated in FIG. 9. FIG. 16 illustrates a top plan view of a configuration of the present inventive concept with the electric wire 51 and the fence 32. It is foreseen that the electrical wire 51 may be powered by a portable power source, e.g., solar power, AC power, and/or the like.

Figure 14:
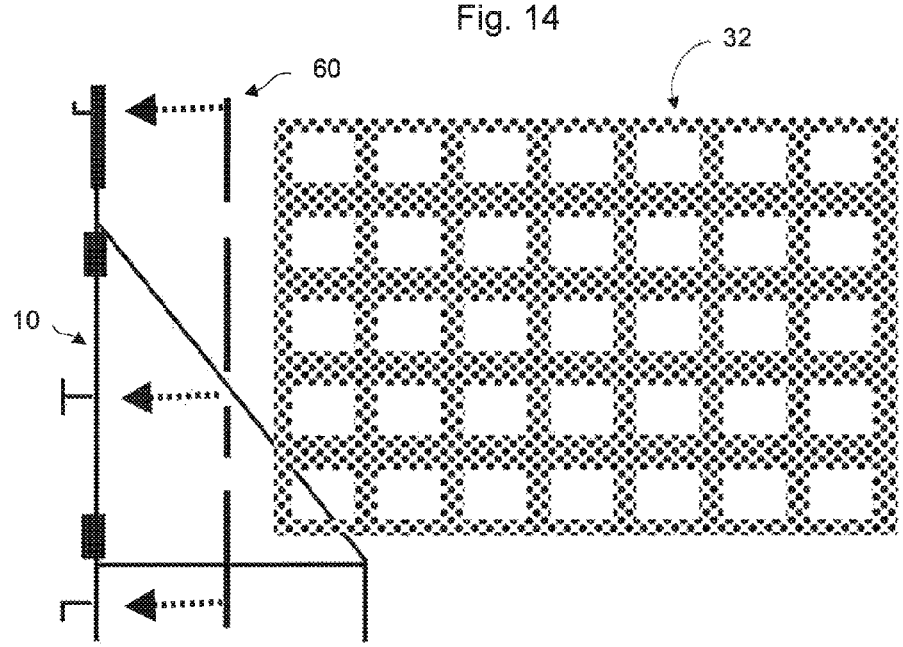
FIG. 14 is a schematic view of view of a rod facilitating engagement to a fence to an adjustable securing element.
Figure 15:
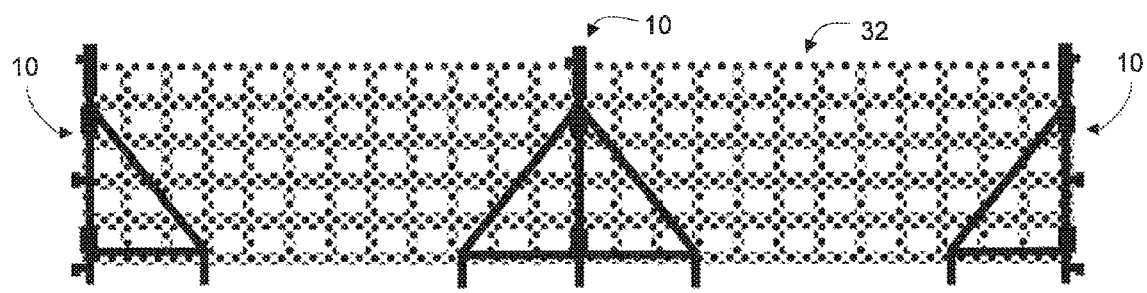
FIG. 15 is a schematic view of view of rods facilitating engagement to a fence to an adjustable securing element.

Turning to FIGS. 14 and 15, a rod 60 may be used to facilitate engagement of the fence 32 to the adjustable securing element 10. The rod 60 is woven through the apertures 42 and then is slipped over one or more of the receivers 26, 28, 30 to engage the fence 32 to the adjustable securing element 10. The rod 60 facilitates use of the adjacent portion of the fence 32 as a gate to and out of the enclosure formed by the present inventive concept. FIG. 15 illustrates the fence 32 engaged with the adjustable securing elements 10.

Figure 17:
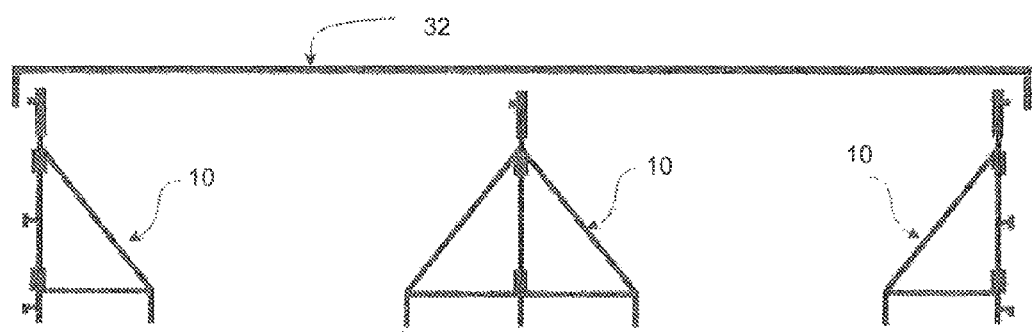
FIG. 17 is a schematic view of view of a fence secured as a top cover to adjustable securing elements.

Turning to FIG. 17, a configuration of the present inventive concept is illustrated in which the fence 32 is secured as a top cover to the adjustable securing elements 10. In this manner, the present inventive concept is capable of use as a protective covering, e.g., to keep birds away from plants.

Figure 13:
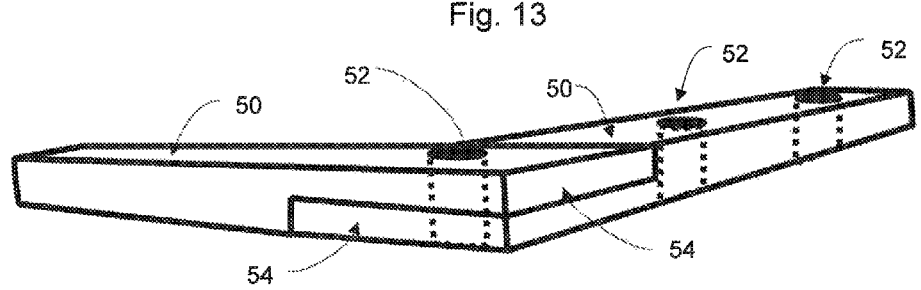
FIG. 13 is a perspective view of a bottom support.

For use on hard surfaces, e.g., concrete, a bottom support 50 may be used, as illustrated in FIGS. 10-13. The bottom support 50 includes a plurality of apertures 52 sized and shaped to at least partially receive ends of the stake 14 and/or the another stake 24. The bottom support 50 includes ends 54 operable to overlap each other, e.g., with each successively-placed one of the bottom support 50 inversed relative to each other. In this manner, one of the stake 14 and the another stake 24 may penetrate an end-most one of the apertures 52 and cause the successively-placed bottom supports 50 to be engaged to each other, as illustrated in FIG. 13.

Accordingly, the present invention provides a portable enclosure system that is easy to assemble and disassemble, and requires minimal storage space.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

What is claimed is:

1. An enclosure system comprising:
  a plurality of adjustable securing elements, each of the adjustable securing elements having (i) a post with two pivoting ends extending therefrom, and (ii) a stake;
  a plurality or receivers secured along each of the posts; and
  a fence operable to be secured to each of the plurality of receivers,
  wherein,
    each of the plurality of receivers are operable to receive a portion of the fence, and
    at least one of the plurality of receivers is operable to rotate with the fence, upon engagement of the at least one of the plurality of receivers with the fence, to increase tension of the fence.

2. The enclosure system of claim 1, wherein the post includes hinges to secure the two pivoting ends to the post.

3. The enclosure system of claim 2, wherein each of the two pivoting ends includes a lower bar extending perpendicular to the post and an angled bar extending from an end of the lower bar to the post.

4. The enclosure system of claim 3, wherein each of the two pivoting ends includes another stake.

5. The enclosure system of claim 4, wherein each of the plurality of adjustable securing elements are operable to be independently configured to one of an open configuration, a closed configuration, and a corner configuration.

6. The enclosure system of claim 1, further comprising:
  a plurality of bottom supports having overlapping ends operable to be aligned and penetrated via a portion of the at least one stake to lock the plurality of bottom supports together.

7. The enclosure system of claim 1, further comprising:
  an electrical wire secured to each of the plurality of adjustable securing elements.

8. The enclosure system of claim 1, wherein,
  the end of the post is a first end that is opposite to a second end of the post, and
  the second end of the post includes the stake.

9. A method of using an enclosure system comprising:
  staking a plurality of adjustable securing elements in the ground, each of the adjustable securing elements having (i) a post with two pivoting ends extending therefrom, (ii) a stake and (iii) a plurality or receivers secured along each of the posts; and
  securing a fence to each of the plurality of receivers,
  wherein,
    each of the plurality of receivers are operable to receive a portion of the fence, and
    at least one of the plurality of receivers is operable to rotate with the fence, upon engagement of the at least one of the plurality of receivers with the fence, to increase tension of the fence.

10. The method of claim 9, wherein the post includes hinges to secure the two pivoting ends to the post.

11. The method of claim 10, wherein each of the two pivoting ends includes a lower bar extending perpendicular to the post and an angled bar extending from an end of the lower bar to the post.

12. The method of claim 11, wherein each of the two pivoting ends includes another stake.

13. The method of claim 12, wherein each of the plurality of adjustable securing elements are operable to be independently configured to one of an open configuration, a closed configuration, and a corner configuration.

14. The method of claim 9, wherein,
  the end of the post is a first end that is opposite to a second end of the post, and
  the second end of the post includes the stake.

* * * * *